(12) United States Patent
Renaud et al.

(10) Patent No.: US 12,514,534 B2
(45) Date of Patent: Jan. 6, 2026

(54) METHOD FOR ESTIMATING A MOVEMENT OF PARTICLES IN A BONE

(71) Applicants: SORBONNE UNIVERSITÉ, Paris (FR); CENTRE NATIONAL DE LA RECHERCHE SCIENTIFIQUE (CNRS), Paris (FR); INSERM (INSTITUT NATIONAL DE LA SANTÉ ET DE LA RECHERCHE MÉDICALE), Paris (FR); TECHNISCHE UNIVERSITEIT DELFT, Delft (NL)

(72) Inventors: Guillaume Renaud, Paris (FR); Sébastien Salles, Paris (FR)

(73) Assignees: SORBONNE UNIVERSITÉ, Paris (FR); CENTRE NATIONAL DE LA RECHERCHE SCIENTIFIQUE (CNRS)., Paris (FR); INSERM (INSTITUT NATIONAL DE LA SANTÉ ET DE LA RECHERCHE MÉDICALE), Paris (FR); TECHNISCHE UNIVERSITEIT DELFT, Delft (NL)

( * ) Notice: Subject to any disclaimer, the term of this patent is extended or adjusted under 35 U.S.C. 154(b) by 0 days.

(21) Appl. No.: 18/839,173

(22) PCT Filed: Feb. 16, 2022

(86) PCT No.: PCT/FR2022/050283
§ 371 (c)(1),
(2) Date: Aug. 16, 2024

(87) PCT Pub. No.: WO2023/156716
PCT Pub. Date: Aug. 24, 2023

(65) Prior Publication Data
US 2025/0152124 A1    May 15, 2025

(51) Int. Cl.
A61B 8/06    (2006.01)
A61B 8/00    (2006.01)
G06T 7/246   (2017.01)

(52) U.S. Cl.
CPC .............. *A61B 8/06* (2013.01); *A61B 8/5207* (2013.01); *G06T 7/248* (2017.01);
(Continued)

(58) Field of Classification Search
None
See application file for complete search history.

(56) References Cited

U.S. PATENT DOCUMENTS

2020/0121240 A1\*   4/2020   Jiang .................... A61B 8/5223

FOREIGN PATENT DOCUMENTS

RU        2691305 C1 \*  6/2019   ............... A61B 8/06

OTHER PUBLICATIONS

Lenge et al., "Plane-wave transverse oscillation for high-frame-rate 2-D vector flow imaging," (Dec. 9, 2015), IEEE Transactions on Ultrasonics, Ferroelectrics, and Frequency Control ( vol. 62, Issue: 12, Dec. 2015). (Year: 2015).\*

(Continued)

*Primary Examiner* — Keith M Raymond
*Assistant Examiner* — Ashish S Jasani
(74) *Attorney, Agent, or Firm* — Maier & Maier, PLLC (57) ABSTRACT

Method for estimating a movement of particles in a bone, including the following steps: obtaining data associated with ultrasonic waves emitted at a temporal frequency; obtaining ultrasonic wave phase velocities in the bone in various directions followed by the ultrasonic waves; obtaining videos showing the bone at a point, the videos issuing from ultrasonic waves; computing phase variations at the point between two images of the videos; and computing a particle movement at the point based on the temporal frequency, the (Continued)

data associated with the ultrasonic waves, the phase variations, and the phase velocities in the various directions.

16 Claims, 8 Drawing Sheets

(52) U.S. Cl.
 CPC .............. *G06T 2207/10016* (2013.01); *G06T 2207/10132* (2013.01); *G06T 2207/20048* (2013.01); *G06T 2207/30008* (2013.01); *G06T 2207/30104* (2013.01)

(56) References Cited

OTHER PUBLICATIONS

Jensen et al., "Ultrasound Vector Flow Imaging—Part I: Sequential Systems," (Aug. 16, 2016), IEEE Transactions on Ultrasonics, Ferroelectrics, and Frequency Control ( vol. 63, Issue: 11, Nov. 2016). (Year: 2016).*

Jensen et al., "Ultrasound Vector Flow Imaging—Part II: Sequential Systems," (Aug. 5, 2016), IEEE Transactions on Ultrasonics, Ferroelectrics, and Frequency Control ( vol. 63, Issue: 11, Nov. 2016). (Year: 2016).*

Jensen et al., "Fast Plane Wave 2-D Vector Flow Imaging Using Transverse Oscillation and Directional Beamforming," (Apr. 12, 2017), IEEE Transactions on Ultrasonics, Ferroelectrics, and Frequency Control (vol. 64, Issue: 7, Jul. 2017). (Year: 2017).*

Dyke et al. ("Noninvasive methods of measuring bone blood perfusion," (Jun. 30, 2010) Ann N Y Acad Sci. Mar. 2010;1192(1):95-102. (Year: 2010).*

Tomlinson et al., "Skeletal Blood Flow in Bone Repair and Maintenance," (Dec. 31, 2013), Bone Research vol. 1, pp. 311-322 (2013). (Year: 2013).*

Salles et al., "Revealing Intraosseous Blood Flow in the Human Tibia With Ultrasound," (Oct. 22, 2021), BMR Plus. Oct. 22, 2021;5(11):e10543. (Year: 2021).*

Sun et al., Three-Dimensional High Frequency Power Doppler Ultrasonography for the Assessment of Microvasculature during Fracture Healing in a Rat Model, (Jun. 22, 2011), J. Orthop. Res., 30: 137-14. (Year: 2011).*

* cited by examiner

METHOD FOR ESTIMATING A MOVEMENT OF PARTICLES IN A BONE

FIELD

This document relates to a method for estimating a movement of particles in a bone.

BACKGROUND

To estimate a movement of blood in a body, methods using ultrasound systems have been proposed. These ultrasound systems produce videos based on echoes of ultrasonic waves that have passed through the body. These videos are then processed to extract movements.

These methods known from the state of the art make the following three hypotheses:
- the propagation velocity of an ultrasonic wave is the same throughout the region investigated,
- the propagation velocity of an ultrasonic wave does not depend on the direction of propagation of the wave, and
- in a resolution cell (the smallest volume resolved by the ultrasound system), blood moves in only one direction.

However, these methods do not allow to estimate the movement of blood inside a bone with sufficient precision.

SUMMARY

A purpose of the invention is to precisely estimate the movement of particles in a bone.

For this purpose, according to a first aspect, the method as defined in claim 1 is proposed.

The method according to the first aspect is such that the computing of the movement involves not a single phase velocity (that is to say a velocity of propagation of the ultrasonic wavefront), but several phase velocities in various directions, which takes into account the fact that the bone is an anisotropic elastic medium. The method according to the first aspect thus leads to a much more precise movement estimate than a method whose computation would be based on the hypothesis that the bone is an isotropic elastic medium, in other words on the hypothesis that the phase velocity of a wave in the bone is the same in any direction in space.

The method according to the first aspect may further comprise the optional features set out in the dependent claims, taken alone or in combination where technically possible.

The video filtering mentioned in claims 2 and 3 is very advantageous. The first raw video or the second raw video may show crossing points between multiple superimposed blood vessels containing blood flowing in two different directions. If these vessels are thinner than the resolution cell of the ultrasound system used, computing phase variations between images of the first raw video or the second raw video can lead to erroneous movement computation. Computing phase variations between filtered video images as indicated in claims 2 and 3 overcomes this difficulty.

Other optional but advantageous features are set forth in claims 4 to 9.

Provision is also made of:
- a computer-readable memory storing computer-executable instructions for executing the steps of the method according to the first aspect.
- The device as defined in claim 11
- The ultrasound system as defined in claim 12.

BRIEF DESCRIPTION OF FIGURES

Other characteristics, aims and advantages of the invention will emerge from the description which follows, which is purely illustrative and not limiting, and which must be read with reference to the appended drawings in which.

In all the figures, similar elements bear identical references.

DETAILED DESCRIPTION

1) Ultrasound System According to One Embodiment

Figure 1:
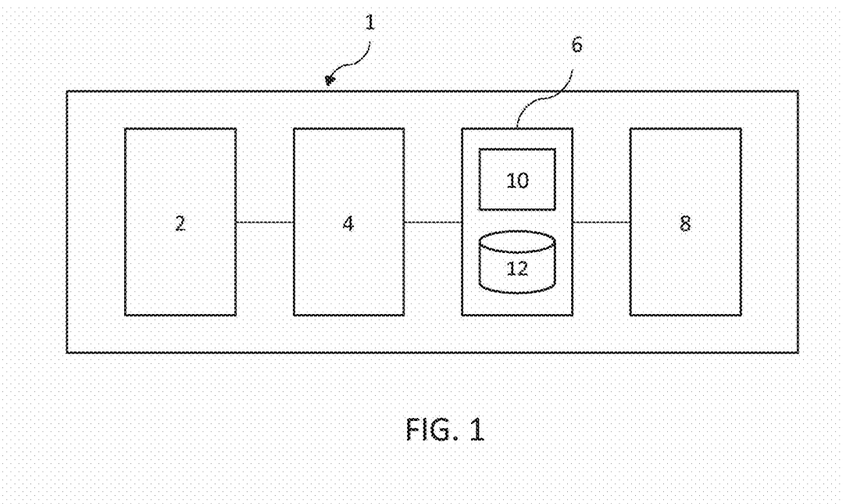
FIG. 1 schematically illustrates an ultrasound system according to one embodiment.

With reference to FIG. 1, an ultrasound system 1 comprises a probe 2, an imaging device 4, and a movement estimation device 6. The system can also comprise a display screen 8.

The probe 2 is conventional. The probe 2 comprises a plurality of ultrasonic wave emitters and receivers. The emitters and receivers are distributed in such a way that an ultrasonic wave emitted by an emitter can be received by a receiver after its reflection at a point located inside a body to be analyzed, in particular a bone as will be seen later.

The imaging device 4 is configured to generate raw videos showing the interior of the structure to be analyzed from ultrasonic echoes received by the probe. The imaging device is known from the state of the art.

As a reminder, the impulse response of the imaging device 4 can be described by the point spread function (PSF). The name of this function illustrates the fact that the response of the imaging device 4 to a point object is a pattern visible in an image generated by the imaging device 4, this pattern having parallel fringes, as illustrated in FIG. 2.

Figure 2:
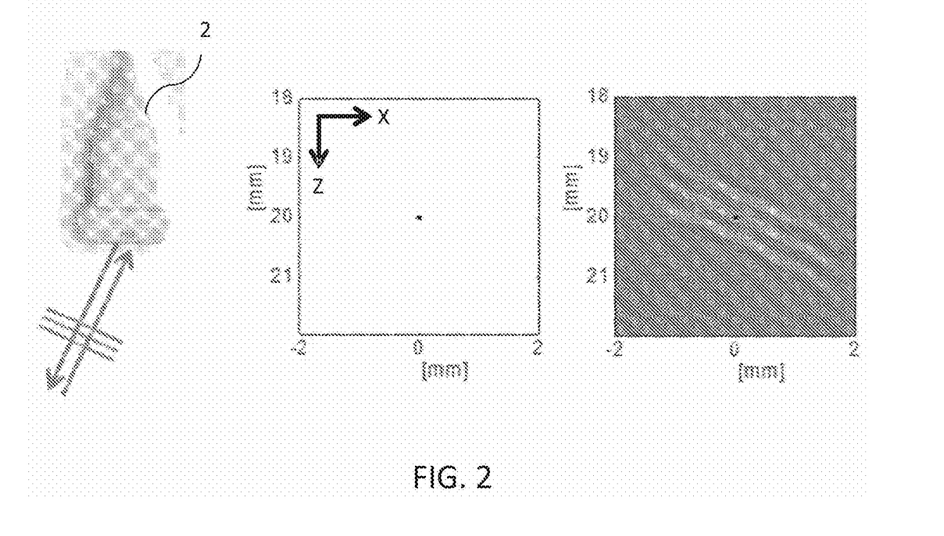
FIG. 2 shows a schematic trajectory of an ultrasonic wave, a point on this trajectory and the image of this point by application of a point spreading function.

There is a close relationship between the fringes of the pattern and the ultrasonic wavefront from which the pattern comes (this wavefront being represented on the left of FIG. 2 by three parallel lines).

On the one hand, the peak-to-peak distance between two successive fringes of the pattern is $\lambda/2$, knowing that $\lambda = c_0/f_0$, where $c_0$ is the phase velocity of the ultrasonic wave, and $f_0$ is the temporal frequency of the ultrasonic wave.

On the other hand, the inclination of the fringes of the pattern in an image produced by the imaging device is a function of the direction of propagation of the ultrasonic wave.

When a point object is static relative to the probe, the fringe pattern which constitutes the response is also static in a succession of images generated by the imaging device 4. But when the point object moves relative to the probe, the fringe pattern moves in the image succession. Thus, a signal observed in a given pixel of such a succession of images varies. This signal in particular has a phase which varies from one image of the video to another.

Returning to FIG. 1, the movement estimation device 6 comprises at least one processor 10 and a memory 12.

The memory 12 is configured to store data which will be detailed below. The memory 12 is of any type. The memory 12 may in particular comprise a volatile memory for storing data temporarily (for example of RAM type), and a non-volatile memory for storing data persistently (for example of flash type, EEPROM, HDD, etc.).

The or each processor 10 is configured to execute a program comprising code instructions stored in the memory 12. When this program is executed by the or each processor 10, the device 6 implements a method for estimating the movement of particles in the structure probed by the probe using ultrasonic waves. This method is described below.

The or each processor 10 is of any type (CPU, controller, microcontroller, ASIC, FPGA, etc.). In what follows, the example of an embodiment in which the estimation device comprises a processor will be taken, it being understood that, in other embodiments, several processors 10 can be used, in particular to execute different tasks of the aforementioned program in parallel.

2) Method Implemented by the Ultrasound System

Figure 3:
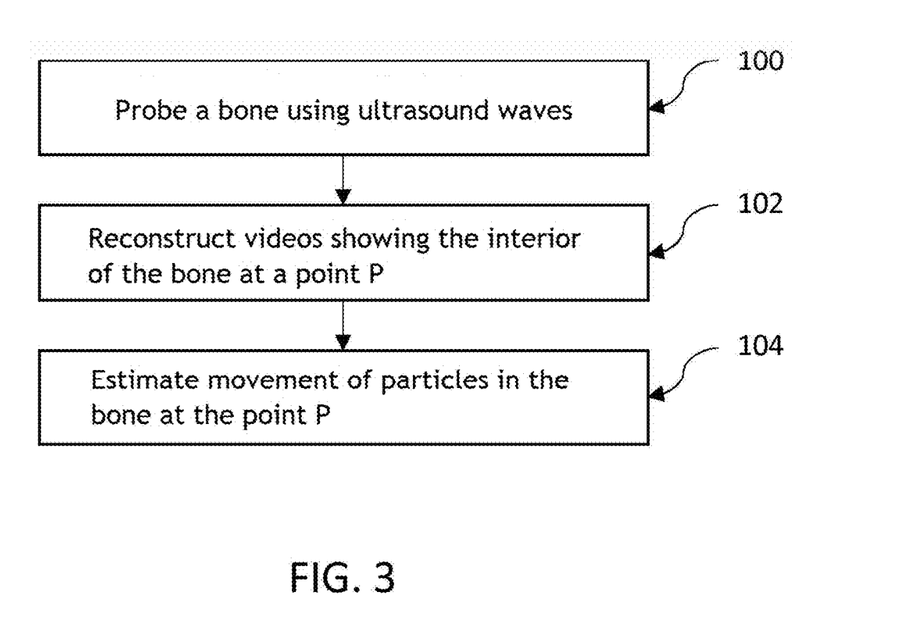
FIG. 3 is a flowchart of steps of an ultrasound method according to one embodiment.

With reference to FIG. 3, a method implemented by the system comprises the following steps.

2.1) Probing Using Ultrasonic Waves

In a probing step 100, the probe 2 is used to probe a bone using ultrasonic waves. The probe 2 emits ultrasonic waves at a frequency $f_0$ towards the bone. These ultrasonic waves penetrate the bone.

The temporal frequency $f_0$ has a value comprised between 0.1 MHz and 10 MHz.

Ultrasonic echoes resulting from the reflection of these ultrasonic waves inside the bone are then received by the probe.

It should be noted that ultrasonic waves having followed different trajectories can reach the same point located inside the bone. The ultrasonic echoes resulting from the reflection of these ultrasonic waves at this point also follow different trajectories.

Consider in particular a fixed point located inside the bone, which will be called point P.

The probe 2 emits first ultrasonic waves with a temporal frequency $f_0$ towards this point P, and receives first ultrasonic echoes obtained by reflection of the first ultrasonic waves at the point P.

The first ultrasonic waves and the first echoes have wavefronts oriented differently during their propagation in the bone. Thus:
- the orientation of the wavefront of the first ultrasonic waves can be characterized by a direction normal to this wavefront, which is conventionally called "first emission direction" (to mean that it is a "forward" path of the first waves leading to the considered point P).
- the orientation of the wavefront of the first ultrasonic echoes can be characterized by a direction normal to this wavefront, which is conventionally called "first reception direction" (to mean that it is a "reverse" path followed by the first echoes before reception by the probe 2, and to distinguish it from the first emission direction defined previously).

The probe 2 also emits second ultrasonic waves at the same temporal frequency $f_0$ towards the same point P, and receives second ultrasonic echoes obtained by reflection of the second ultrasonic waves at the point P.

The second ultrasonic waves and the second echoes have differently oriented wavefronts as they propagate through the bone. Thus:
- the orientation of the wavefront of the second ultrasonic waves can be characterized by a direction normal to this wavefront, which is conventionally called "second emission direction" (to mean that it is a "forward" path of the second waves leading to the considered point P).
- the orientation of the wavefront of the second ultrasonic echoes can be characterized by a direction normal to this wavefront, which is conventionally called "second reception direction" (to mean that it is the "reverse" path followed by the second echoes before reception by the probe 2, and to distinguish it from the second emission direction defined previously).

The second ultrasonic waves and the second echoes have the same temporal frequency and are distinguished from the first ultrasonic waves and their echoes in particular by their propagation trajectory, and by the orientation of their wavefronts during their propagation. In other words, at least one of the following two conditions is verified:
- the second emission direction is different from the first normal emission direction, and
- the second reception direction is different from the first normal reception direction.

Thus, at least two pairs of wavefront directions are formally associated with the same point P located inside the bone, these pairs of different directions characterizing different trajectories of emitted ultrasonic waves and received ultrasonic echoes passing through this point P. As will be seen below, the probe can use more than two pairs of wavefront directions in step 100.

As will be seen in more detail later, the directions normal to the wavefronts discussed previously can be directions in a two-dimensional space or a three-dimensional space. Moreover, these directions can be indicated by data in different forms, in particular angular data or vectors. For example, when considering directions in a plane, the first emission direction may be indicated by a first emission phase angle, and the first reception direction may be indicated by a first reception phase angle.

2.2) Reconstruction of Videos of the Bone from Ultrasonic Echoes

In a reconstruction step 102 known from the state of the art, the imaging device 4 uses the ultrasonic echoes received by the probe to reconstruct raw videos showing the interior of the bone.

Each raw video generated by the imaging device comprises a succession of images showing the interior of the bone at different times. When particles move inside the observed bone, for example red blood cells, these particles can be represented in different locations in different frames of the same video.

Each image represents a layer of the bone extending in a plane defined by two axes X and Z (shown in FIG. 2).

In particular, the imaging device 4 generates a first raw video showing the interior of the bone at the point P, from the first ultrasonic echoes.

Moreover, the imaging device generates a second raw video showing the interior of the bone at the point P, from the second ultrasonic echoes.

Each raw video generated in the reconstruction step 102 is stored in memory 12 (in particular the first raw video and the second raw video).

Likewise, each pair of angles used by the probe in the probing step 100 is stored in the memory 12 (in particular the first pair of angles and the second pair of angles). This storage can be carried out before or after the probing step 100 implemented by the probe 2. The determination of these pairs of angles is known to the person skilled in the art.

2.3) Estimation of a Movement of Particles in the Bone

The estimation device 6 implements a method for estimating the movement of particles in the bone. This method comprises the following steps, relating to FIG. 4.

Figure 4:
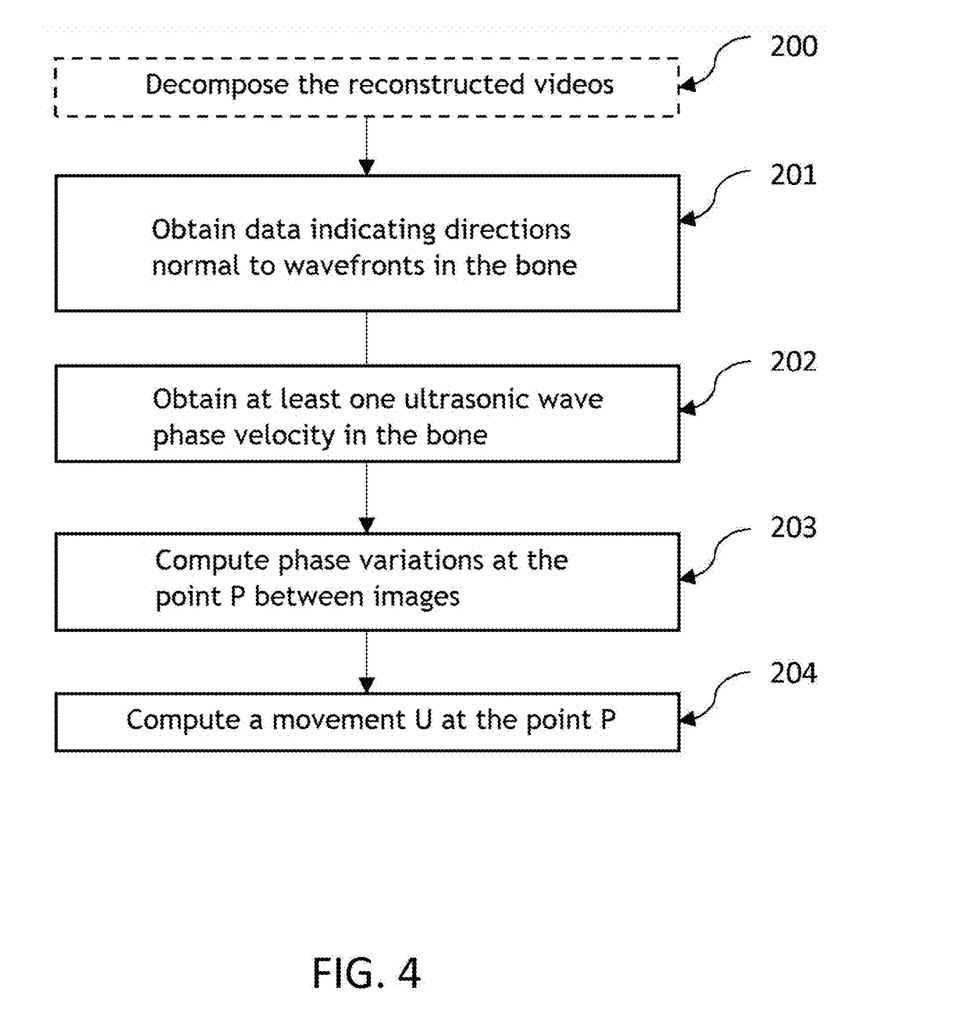
FIG. 4 is a flowchart of steps of a method for estimating a movement of particles, according to one embodiment.

In a step 201, the estimation device obtains data associated with different ultrasonic waves, and these data revealing the orientation of the wavefronts of the associated waves and their echoes.

In particular, in step 201, the estimation device obtains first data associated with the first ultrasonic waves, the first data indicating the first emission direction and the first reception direction. The estimation device also obtains second data, the second data indicating the second emission direction, and the second reception direction. The second data is at least partly different from the first data.

In a step 202, the processor 10 obtains at least one ultrasonic wave phase velocity in the bone. It will be seen below that the number of velocities obtained during this step can vary, depending on the embodiment considered.

In a step 203, the processor 10 computes phase variations at the point P, between two images coming from different videos.

In particular, the processor 10 computes in step 203 a first phase variation $\Delta\Psi_{11}$ at the point P between two first images issued directly or indirectly from the first raw video. This computing is a known step in the state of the art.

Moreover, the processor computes a second phase variation $\Delta\Psi_{22}$ at the point P, between two second images separated by the same time difference as the two first images discussed previously. The two second images are issued directly or indirectly from the second raw video.

In reality, several phase variations (including the first phase variation $\Delta\Psi_{11}$ and the second phase variation $\Delta\Psi_{22}$) are computed by the processor for a pixel of fixed coordinates in images (including the two first images and the two second images), this pixel imaging the point P discussed previously. It can therefore be said that the first phase variation $\Delta\Psi_{11}$ and the second phase variation $\Delta\Psi_{22}$ are computed at the point P.

In a step 204, the processor 10 computes a particle movement U at the point P. This movement U is a vector U with several components. The movement U is computed by the processor from the following data:
- the temporal frequency $f_0$,
- the first data and the second data obtained in step 201,
- the first phase variation $\Delta\Psi_{11}$ and the second phase variation $\Delta\Psi_{mn}$ computed in step 203, and
- each ultrasonic wave phase velocity in the bone, obtained in step 202.

In a subsequent step, the processor can compute a particle velocity vector at the point P, by dividing the movement vector U by the time difference between the two images of the first video (corresponding to the time difference between the two images of the second video).

This velocity vector can then be displayed superimposed with an image of the interior of the bone by the display screen 8 (the point of origin of this vector being located at the pixel of this image which shows the point P discussed previously).

All the preceding steps are repeated for several points located inside the bone, imaged in different pixels of the videos considered.

In what follows, a conventional approach for estimating a movement of particles in a medium will be described first, before detailing different embodiments of the method 104, which differ from this conventional approach.

2.3.1) Conventional Approach: Isotropic Elasticity Medium, 2D Movement, Processing Based on Raw Videos A known method consists in implementing steps 201 to 204 on images showing soft tissues only (therefore no bones). In this known method:
- the two first images belong to the first raw video;
- the two second images belong to the second raw video;
- the movement U is a 2D movement vector, that is to say with two components: a movement component $U_Z$ parallel to the axis Z, and a movement component $U_X$ parallel to the axis X.

Figure 5A:
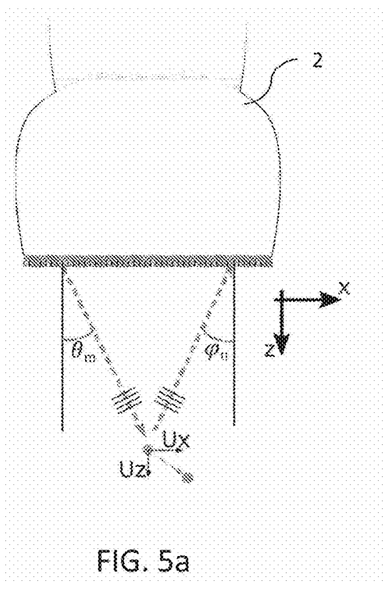
FIG. 5*a* schematically shows the trajectory of an ultrasonic wave and an echo of this wave resulting from the reflection of the ultrasonic wave at a point in a medium containing no bone and whose elasticity is isotropic.

Furthermore, in this first embodiment, the processor makes the hypothesis in the computing step 204 that the medium observed in the videos is isotropic, as illustrated in FIG. 5a. For this purpose, a phase velocity of the ultrasonic wave $c_0$ in the medium traversed is stored in memory 12, assumed to be the same for any direction of wave propagation. This velocity is determined beforehand using a method known to the person skilled in the art.

In the first embodiment, the first data comprise:
- phase angle $\eta_1$ of the first ultrasonic waves during their propagation in the medium traversed, before reaching the point P. This phase angle $\eta_1$ indicates the first emission direction.
- a phase angle $\mu_1$ of the first ultrasonic echoes, during their propagation in the medium traversed. This phase angle $\mu_1$ indicates the first reception direction.

Moreover, the second data comprises:
- a phase angle $\eta_2$ of the second ultrasonic waves during their propagation in the medium, before reaching the point P. This phase angle $\eta_1$ indicates the second emission direction.

a phase angle $\mu_2$ of the first ultrasonic echoes, during their propagation in the medium. This phase angle $\mu_2$ indicates the second reception direction.

$$\eta_1 = \theta_1$$

$$\eta_2 = \theta_2$$

$$\mu_1 = \varphi_1$$

$$\mu_n = \varphi_2$$

Where:
$\theta_1$ is the group angle of the first ultrasonic waves,
$\varphi_1$ is the group angle of the first ultrasonic echoes,
$\theta_2$ is the group angle of the second ultrasonic waves, and
$\varphi_2$ is the group angle of the second ultrasonic echoes.

These equalities between group angle and phase angle come from the fact that the medium traversed by the waves has isotropic elasticity.

In this known method, the computing carried out in step 204 comprises a resolution of the following matrix equation by the processor 10, in which these two components are $U_Z$ and $U_X$ are unknowns:

$$\begin{bmatrix} \cos\eta_1 + \cos\mu_1 & \sin\eta_1 + \sin\mu_1 \\ \cos\eta_2 + \cos\mu_2 & \sin\eta_2 + \sin\mu_2 \end{bmatrix} \begin{bmatrix} U_Z \\ U_X \end{bmatrix} = \frac{c_0}{2\pi f_0} \begin{bmatrix} \Delta\Psi_{11} \\ \Delta\Psi_{22} \end{bmatrix}$$

Thus, only one phase velocity $c_0$ is involved in this computing.

2.3.2) Embodiment 1: Bone Assumed to be an Anisotropic Elasticity Medium, 2D Movement, Processing Based on Raw Videos In a first embodiment of the estimation method 104:
the two first images belong to the first raw video;
the two second images belong to the second raw video;
the movement U is a 2D movement vector, that is to say with two components: a movement component $U_Z$ parallel to the axis Z, and a movement component $U_X$ parallel to the axis X.

Figure 5B:
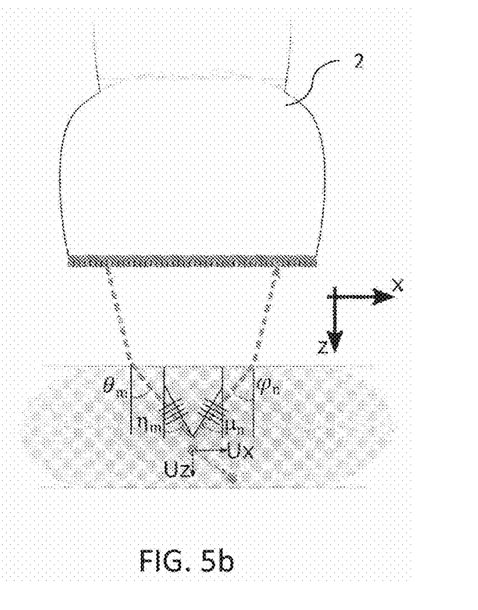
FIG. 5*b* schematically shows the trajectory of an ultrasonic wave and an echo of this wave resulting from the reflection of the ultrasonic wave at a point inside a bone.

The first embodiment differs from the known method discussed previously in that the medium traversed contains a bone, and the processor assumes that the bone is an elastically anisotropic medium, as illustrated in FIG. 5b.

In the presence of a bone, image reconstruction must correct the refraction effect appearing at the interface between the bone and the surrounding soft tissue. An ultrasound ray changes its direction as it enters or exits a bone, as shown in FIG. 5b. Such image reconstruction is known to the person skilled in the art; it involves tracings of ultrasonic rays. The result of this image reconstruction provides in particular the emission and reception group angles at each point of the image. These group angles correspond to the angle of the last portion of ultrasonic ray which reaches a point P in emission and to the angle of the first portion of ultrasonic ray reflected by a point P in reception.

In the first embodiment, the first data and the second data comprise the same phase angles $\eta_1$, $\mu_1$, $\eta_2$ and $\mu_2$ as in the first embodiment.

On the other hand, as the hypothesis in the first embodiment that the bone is an elastically anisotropic medium is made, there is no longer equality in the phase angles $\eta_1$, $\mu_1$, $\eta_2$ and $\mu_2$ and the group angles $\theta_1$, $\varphi_1$, $\theta_2$ and $\varphi_2$, respectively.

For example, the aforementioned phase angles $\eta_1$, $\mu_1$, $\eta_2$ and $\mu_2$ can be determined from the group angles of the corresponding waves or echoes, and from an anisotropy model of the bone known to the person skilled in the art.

The equation below is a model illustrating the relationship between the group angle $\theta$ of a wave, and the phase angle n of that wave, and the phase velocity v of that wave.

$$\theta(\eta) = \left(\tan\eta + \frac{1}{v}\frac{\partial v}{\partial \eta}\right)\bigg/\left(1 - \frac{\tan\eta}{v}\frac{\partial v}{\partial \eta}\right)$$

In this equation, v depends on the phase angle $\eta$, hence its partial derivation.

This equation can be solved to determine:
the phase angle $\eta_1$ from the group angle $\theta_1$,
the phase angle $\eta_2$ from the group angle $\theta_2$,
the phase angle $\mu_1$ from the group angle $\varphi_1$, and
the phase angle $\mu_2$ from the group angle $\varphi_2$.

This determination of the phase angles from group angles can be implemented by the processor 10 during step 201. Alternatively, the phase angles are determined by other equipment, then supplied to the estimation device 6. In the first embodiment, the processor 10 further obtains different phase velocities of ultrasonic waves in the bone. These phase velocities are no longer equal to one and the same velocity $c_0$ as was the case in the first embodiment. Thus, the phase velocities in the following directions are obtained by the processor 10:

the first emission direction,
the first reception direction,
the second emission direction,
the second reception direction.

In this embodiment, it will be considered that the waves arriving at the point P are compression waves; their phase velocity is noted $v_p$.

To determine these phase velocities, the processor 10 or other equipment can use an anisotropy model of the bone known to the person skilled in the art, formed by a mathematical function, for example for a compression wave whose phase velocity is noted $v_p$. This mathematical function allows to compute, from a phase angle, a phase velocity of an ultrasonic wave in the bone in a direction indicated by this phase angle.

The ultrasonic wave phase velocities can therefore be as follows, when such an anisotropy model of the bone is used: $v_p(\eta_1)$, $v_p(\eta_2)$, $v_p(\mu_1)$ and $v_p(\mu_2)$.

An anisotropy model usable by the person skilled in the art to determine these phase velocities is described in document "Measuring anisotropy of elastic wave velocity with ultrasound imaging and an autofocus method: application to cortical bone.", Guillaume Renaud, Pierre Clouzet, Didier Cassereau, Maryline Talmant, published in November 2020. This anisotropy model is as follows:

$$v_p(\eta) = \alpha_0\left[1 + \epsilon\cos^2(\eta) + D^*(\eta, \alpha_0, \beta_0, \epsilon, \delta^*)\right]^{\frac{1}{2}}$$

Where:

$$D^* = \frac{1}{2}\left(1 - \frac{\beta_0^2}{\alpha_0^2}\right)\left[\left(1 + \frac{4\delta^*}{\left(1 - \frac{\beta_0^2}{\alpha_0^2}\right)^2}\cos^2(\eta)\sin^2(\eta) + \frac{4\left(1 - \frac{\beta_0^2}{\alpha_0^2} + \epsilon\right)\epsilon}{\left(1 - \frac{\beta_0^2}{\alpha_0^2}\right)^2}\cos^4(\eta)\right)^{\frac{1}{2}} - 1\right]$$

$\alpha_0$ designates a propagation velocity of a compression wave in the bone in the direction in which the propagation velocity is maximum.

$\beta_0$ designated a propagation velocity of a shear wave called vertically polarized shear wave in the bone in the direction of maximum propagation velocity of a compression wave, or a direction normal thereto.

$\delta^*$ denotes an elastic anisotropy parameter of the bone.

$\epsilon$ designates another elastic anisotropy parameter of the bone, representative of a difference between the maximum propagation velocity in the bone of a compression wave and the minimum propagation velocity in the bone of a compression wave, typically observed in a direction normal to the direction of maximum propagation velocity of a compression wave.

The four parameters listed above are called Thomsen parameters, because they were proposed by L. Thomsen in the paper entitled "Weak elastic anisotropy", published in 1986.

Another anisotropy model usable by the person skilled in the art to determine these phase velocities, also proposed by L. Thomsen in 1986, is the following:

$$v_p(\eta) = V_{os1} - (V_{os1} - V_{os2})[\xi \sin^2(\eta)\cos^2(\eta) + \cos^4(\eta)]$$

Where $V_{os1}$ is the propagation velocity of compression waves in the bone in the direction for which the propagation velocity is maximum, $V_{os2}$ is the propagation velocity of compression waves in the bone in the direction for which the propagation velocity is minimum, $\xi$ is the anisotropy parameter of the bone, $\eta$ is a phase angle, defined relative to the direction for which the propagation velocity is minimum, $v_p(\eta)$ is a phase velocity of compression waves in the bone corresponding to the phase angle $\eta$.

In the first embodiment, the computing carried out in step 204 involves the phase velocities of ultrasonic waves in the bone $v_p(\eta_1)$, $v_p(\eta_2)$, $v_p(\mu_1)$ and $v_p(\mu_2)$, and not a single velocity $c_0$ as is the case in the first embodiment.

The computing 204 comprises in the first embodiment a resolution of the following matrix equation by the processor 10, in which the two components $U_Z$ and $U_X$ are unknowns:

$$\begin{bmatrix} \frac{\cos\eta_1}{v_p(\eta_1)} + \frac{\cos\mu_1}{v_p(\mu_1)} & \frac{\sin\eta_1}{v_p(\eta_1)} + \frac{\sin\mu_1}{v_p(\mu_1)} \\ \frac{\cos\eta_2}{v_p(\eta_2)} + \frac{\cos\mu_2}{v_p(\mu_2)} & \frac{\sin\eta_2}{v_p(\eta_2)} + \frac{\sin\mu_2}{v_p(\mu_2)} \end{bmatrix} \begin{bmatrix} U_Z \\ U_X \end{bmatrix} = \frac{1}{2\pi f_0} \begin{bmatrix} \Delta\Psi_{11} \\ \Delta\Psi_{22} \end{bmatrix}$$

Making the hypothesis here that the bone is an anisotropic medium is more faithful to reality. Consequently, the estimation of the particle movement is more precise in the first embodiment than in the known method, the principles of which are recalled in section 2.3.1.

2.3.3) Computing of Movement Based on a Larger Number of Pairs of Emission-Reception Angles/3D Movement In the embodiments described above, a movement at the point P is computed from only two phase variations $\Delta\Psi_{11}$ and $\Delta\Psi_{22}$, respectively associated with first and second data in the form of pairs of phase angles $(\eta_1,\mu_1)$ and $(\eta_2,\mu_2)$. This is sufficient to determine the two unknowns which are the two components $U_Z$ and $U_X$.

However, in other embodiments, additional data can be obtained by the estimation device in step 201, giving rise to the computing of variation of complementary phases during step 203, which are then used to compute a particle movement in the bone in step 204.

In general, the probe can emit ultrasonic waves at M different emission phase angles $\eta_1, \ldots, \eta_m, \ldots \eta_M$, and at N different reception phase angles $\mu_1, \ldots, \mu_n, \ldots \mu_N$, which gives rise to NM pairs of angles $(\eta_m,\mu_n)$. NM phase variations $\Delta\Psi_{mn}$ at the point P are then computed.

The computing of the first embodiment can therefore be generalized to the following equation:

$$\begin{bmatrix} \cos\eta_1 + \cos\mu_1 & \sin\eta_1 + \sin\mu_1 \\ \vdots & \vdots \\ \cos\eta_N + \cos\mu_N & \sin\eta_M + \sin\mu_N \end{bmatrix} \begin{bmatrix} U_Z \\ U_X \end{bmatrix} = \frac{c_0}{2\pi f_0} \begin{bmatrix} \Delta\Psi_{11} \\ \vdots \\ \Delta\Psi_{MN} \end{bmatrix}$$

Similarly, the computing of the first embodiment can therefore be generalized to the following equation, involving NM different phase velocities:

$$\begin{bmatrix} \frac{\cos\eta_1}{v_p(\eta_1)} + \frac{\cos\mu_1}{v_p(\mu_1)} & \frac{\sin\eta_1}{v_p(\eta_1)} + \frac{\sin\mu_1}{v_p(\mu_1)} \\ \vdots & \vdots \\ \frac{\cos\eta_M}{v_p(\eta_M)} + \frac{\cos\mu_N}{v_p(\mu_N)} & \frac{\sin\eta_M}{v_p(\eta_M)} + \frac{\sin\mu_N}{v_p(\mu_N)} \end{bmatrix} \begin{bmatrix} U_Z \\ U_X \end{bmatrix} = \frac{1}{2\pi f_0} \begin{bmatrix} \Delta\Psi_{11} \\ \vdots \\ \Delta\Psi_{MN} \end{bmatrix}$$

These embodiments involve the prior determination of NM ultrasonic wave phase velocities (one velocity per angle $\eta_m$ and per angle $\mu_n$).

These embodiments use excess data to determine two unknowns. This excess number nevertheless has the advantage of providing an estimate of the movement that is more robust to noise.

The method can be generalized to allow the computing in step 204 of a movement in a three-dimensional space where the movement to be estimated has three unknown components Ux, Uy and Uz. Then it becomes easier to describe the orientation of the wavefront by the unit vector normal to the surface of the ultrasonic wavefront, E(Ex,Ey,Ez) in emission and R(Rx,Ry,Rz) in reception, rather than with a phase angle. To estimate the three components of the movement in the three spatial dimensions called x,y and z, it is then necessary to use at least three pairs of emission and reception directions. These three pairs of emission and reception directions would then be defined by the pairs of unit vectors (E1,R1), (E2,R2) and (E3,R3).

$$\begin{bmatrix} \frac{E_{Z1}}{v_p(E_1)} + \frac{R_{Z1}}{v_p(R_1)} & \frac{E_{Y1}}{v_p(E_1)} + \frac{R_{Y1}}{v_p(R_1)} & \frac{E_{X1}}{v_p(E_1)} + \frac{R_{X1}}{v_p(R_1)} \\ \frac{E_{Z2}}{v_p(E_2)} + \frac{R_{Z2}}{v_p(R_2)} & \frac{E_{Y2}}{v_p(E_2)} + \frac{R_{Y2}}{v_p(R_2)} & \frac{E_{X2}}{v_p(E_2)} + \frac{R_{X2}}{v_p(R_2)} \\ \frac{E_{Z3}}{v_p(E_3)} + \frac{R_{Z3}}{v_p(R_3)} & \frac{E_{Y3}}{v_p(E_3)} + \frac{R_{Y3}}{v_p(R_3)} & \frac{E_{X3I}}{v_p(E_3)} + \frac{R_{X3}}{v_p(R_3)} \end{bmatrix} \begin{bmatrix} U_Z \\ U_Y \\ U_X \end{bmatrix} =$$

$$\frac{1}{2\pi f_0} \begin{bmatrix} \Delta\Psi_{11} \\ \Delta\Psi_{22} \\ \Delta\Psi_{33} \end{bmatrix}$$

As for a two-dimensional space, this system of three linear equations with three unknowns can be extended to a system of overdetermined equations using M emission directions and N reception directions, in order to obtain an estimate of the movement which is more robust to the noise.

2.3.4) Prior Filtering of Videos by Direction of Movement

In other embodiments, for any m and for any n, the two images leading to the phase variation $\Delta\Psi_{mn}$ do not belong to the raw video associated with the pair of angles $(\theta_m,\varphi_n)$, but belong to a filtered video generated during an additional decomposition step 200 implemented by the processor 10. This decomposition step 200, optional but very advantageous, is shown in dotted lines in FIG. 4.

Figure 6:
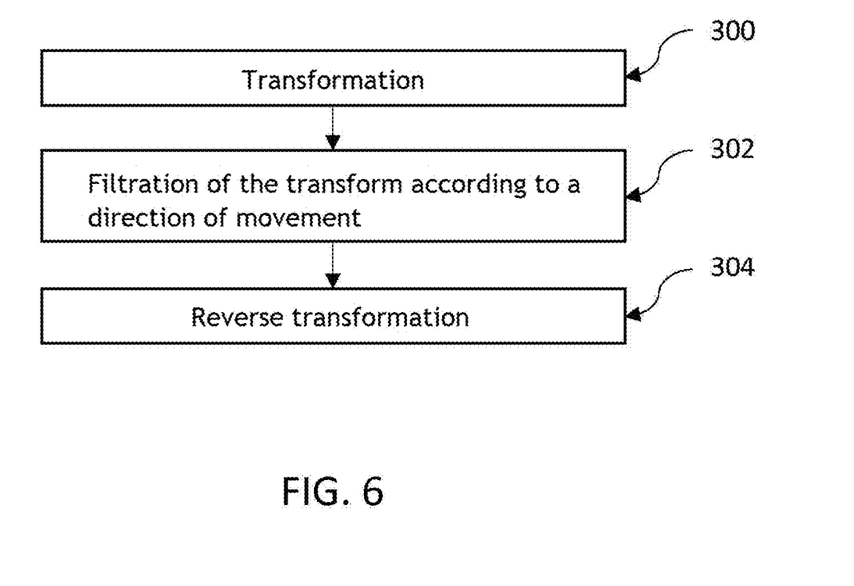
FIG. 6 is a flowchart of steps of a filtering method according to one embodiment, this filtering method constituting a step of the method of FIG. 4.

With reference to FIG. 6n in the decomposition step 300, the processor decomposes the raw video associated with the pair of angles $(\theta_m,\varphi_n)$ into K first filtered videos, for any m and for any n.

The decomposition 300 of the raw video associated with the pair of angles $(\theta_m,\varphi_n)$ comprises the following substeps.

The processor applies a transformation to the raw video associated with the pair of angles $(\theta_m,\varphi_n)$ so as to generate a transform (step 300). The transform has the particular property of comprising information relating to movements of particles in the bone in K different directions, and which can be distinguished from one another.

The processor applies filtering to the transform, so as to produce K filtered transforms. Each filtered transform selectively comprises information on movement of particles in the bone in one direction among the aforementioned K directions, excluding all other particle movement directions.

The processor then applies an inverse transformation to each filtered transform, so as to obtain the first K filtered videos. The first K filtered videos contain different and complementary movement information.

In particular, the transformation applied in step 300 is a Fourier transform, and the transformation applied in step 304 is an inverse Fourier transform.

As an illustration, consider an example of carrying out decomposition 200 in which K=2 is chosen. The transform then comprises:
information on movement of particles in the bone in a first direction (for example upwards), and
information on movement of particles in the bone in a second direction opposite to the first direction (for example downwards).

In this embodiment, the processor can produce in step 302:
a filtered transform comprising the movement information in the first direction, but not the movement information in the second direction; and
a first complementary filtered transform, comprising the movement information in the second direction, but not the movement information in the first direction.

Then, two first filtered videos are obtained by applying the inverse transformation to these two filtered transforms.

Alternatively, K=4 can be chosen. The first transform then comprises:
information on movement of particles in the bone in a first direction, and
information on movement of particles in the bone in a second direction opposite to the first direction.
information on movement of particles in the bone in a third direction perpendicular to the first direction.
information on movement of particles in the bone in a fourth direction opposite to the third direction.

Figure 7:
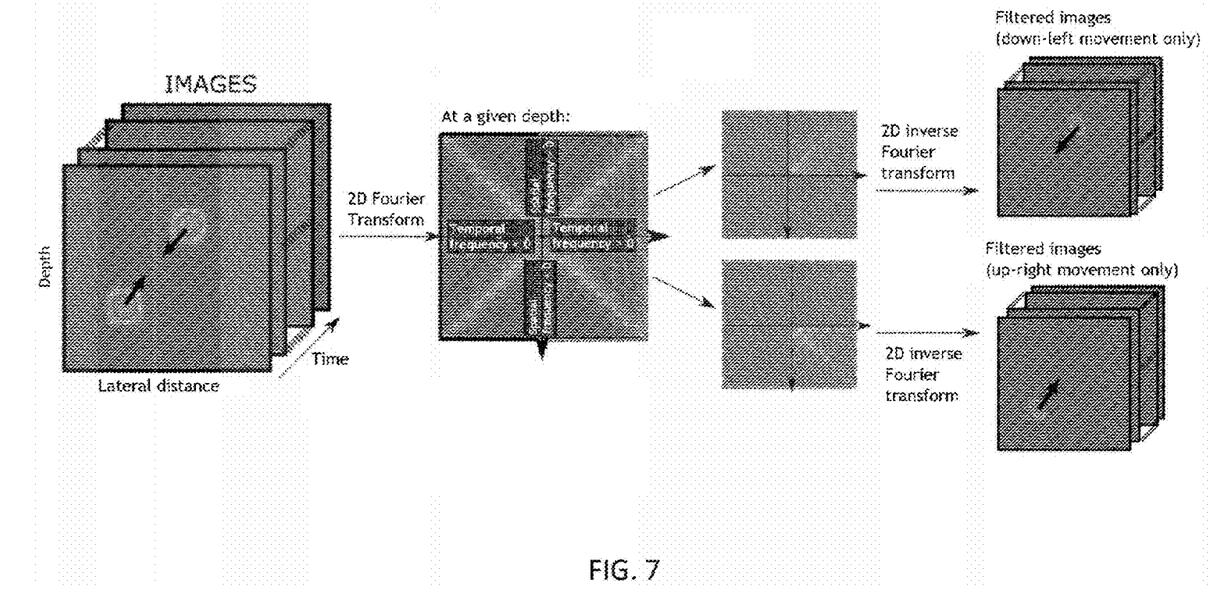
FIG. 7 schematically shows data obtained at different stages of an implementation of the filtering method of FIG. 6.

FIG. 7 shows an embodiment of the decomposition with K=4, and using a Fourier transform. On the left of FIG. 7, a raw video is shown in the form of a succession of images associated with different times. The four directions of movement considered are movements in two mutually perpendicular diagonal directions (up left direction, up right direction, down left direction, down right direction). With such a division, the Fourier transform obtained in step 300 comprises, for a given temporal frequency, four quadrants respectively containing the movement information in the four aforementioned directions. In step 302, a mask is applied to the Fourier transform, allowing to select one quadrant out of the four, for example the quadrant corresponding to the top right direction of movement. On the right of FIG. 7 is shown the filtered video issuing from this filtering and the subsequent inverse transformation.

As indicated previously, the decomposition step 200 is implemented for any m and for any n, that is to say for each raw video associated with a pair of angles $(\theta_m,\varphi_n)$, so as to produce K filtered videos associated for a pair of angles $(\theta_m,\varphi_n)$. In total, MNK filtered videos are therefore produced.

Then, for any m and for any n, the processor selects a filtered video among the K filtered videos associated with the pair of angles $(\theta_m,\varphi_n)$. MN filtered videos are therefore selected.

The MN videos filtered then selected by the processor all result from a filtering in the same direction of movement of particles (for example the first direction of movement mentioned above).

Each filtered then selected video thereafter gives rise to the computing of a phase variation $\Delta\Psi_{mn}$, as indicated previously.

The filtered videos constitute much more readable images than the raw videos originally generated by the imaging device. Thus, applying steps 203 and 204 to images belonging to these filtered videos improves the precision of the estimated movement.

Furthermore, it is possible to compute up to K−1 complementary movements at the point P by repeating the computing steps for images from filtered videos which have not yet been selected.

Figure 8:
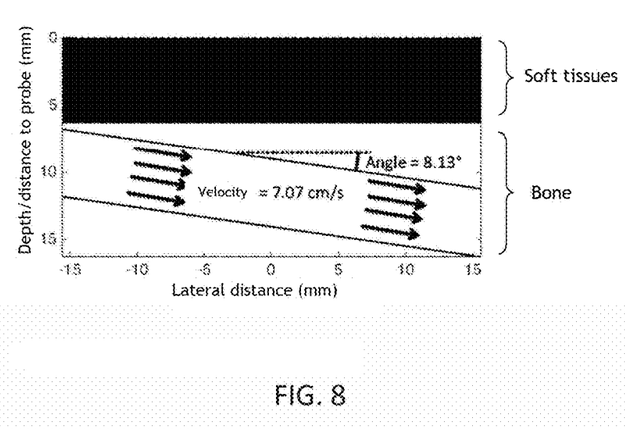
FIG. 8 is a schematic sectional view of a blood vessel located in a bone and in which particles move in an oblique direction.

3) Results and Advantages 3.1. Advantages Conferred by the First Embodiment, Compared to the Conventional Approach FIG. 8 shows an example of a blood vessel in a bone in which particles move in an oblique direction forming an angle of 8.13 degrees relative to its external surface of the bone. The true velocity of these particles is 7.07 centimeters per second.

Implementation of the method according to the first embodiment detailed in section 2.3.2 and according to the conventional approach presented in section 2.3.1 allows to produce particle movements, from which particle velocity vectors can be deduced, as indicated previously.

Figure 9A:
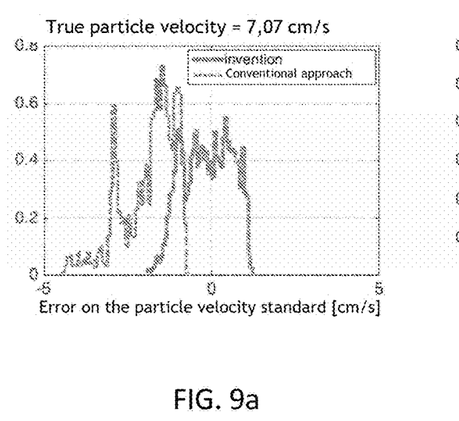
FIG. 9*a* shows errors that affect the standard of velocities estimated via the method according to the embodiment of FIG. 3, and the standard of velocities estimated via a conventional approach.
Figure 9B:
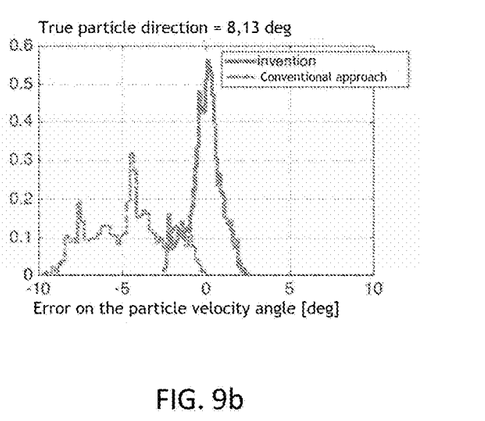
FIG. 9*b* shows errors that affect the angle of velocities estimated via the method according to the embodiment of FIG. 3, and the angle of velocities estimated via a conventional approach.

As shown in FIGS. 9a and 9b, the norm and direction of these estimated velocity vectors are subject to errors compared to the "true" particle velocity vector. However, it is noted that the first embodiment allows to obtain movements affected by lower standard and direction errors than with the conventional approach.

Figure 10:
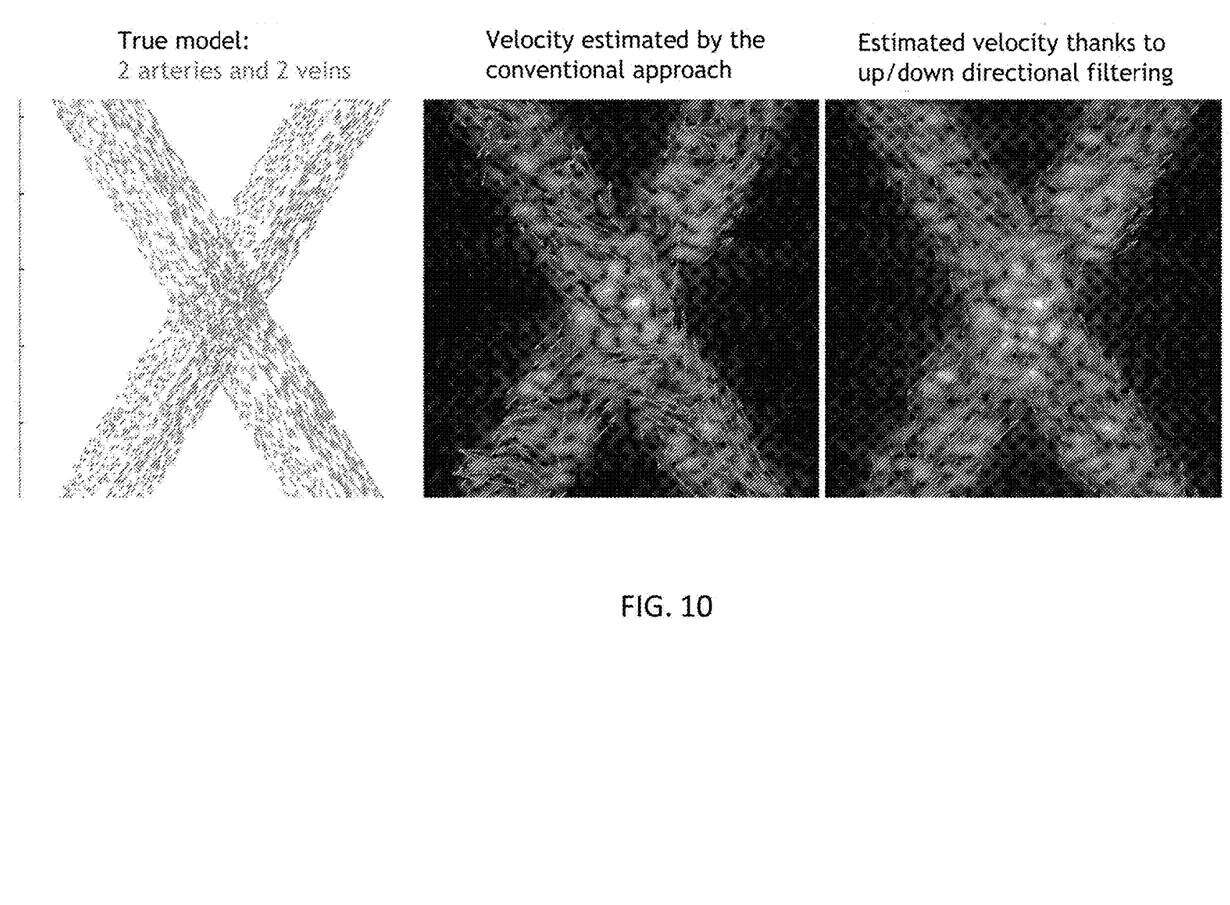
FIG. 10 comprises three views: on the left, a schematic view of a medium in which particles move in four different directions; in the middle, a view showing the velocities of these particles estimated using a conventional approach; on the right, a view showing the velocities of these particles estimated using the filtering method of FIG. 6.

3.1. Advantages Conferred by Filtering, Compared to the Conventional Approach On the left of FIG. 10 is shown a section of a fictitious bone comprising particles moving in four directions, in two directions forming an X. These particles intersect at a central intersection (center of the X).

In the middle of FIG. 10 is shown a simulated raw image of this section which would be reconstructed by the imaging device 4, on the basis of ultrasonic echoes reflected by the fictitious bone at this section. The arrows shown on the simulated raw image represent particle velocity vectors computed at different points, without filtering.

On the right of FIG. 10 is shown a filtered image of this same section which is obtained by applying filtering according to step 200 to the simulated raw image (the direction of movement retained in the filtered image is a direction of movement of particles upwards). The arrows shown in this filtered image represent particle velocity vectors computed at different points, with prior filtering in the upward direction of movement). Then the estimation of the velocity vectors is repeated by selecting the direction of movement downwards. In other words, in this embodiment, we have K=2.

It is noted that the simulated raw image contains a certain number of vectors with aberrant orientations, in particular at the central intersection. This is due to the fact that the spatial resolution of the ultrasound system is not sufficient to spatially distinguish the different vessels. Thanks to the directional filtering moving in the "up" direction then in the "down" direction, the velocity vectors that could be determined are much less aberrant.

The invention claimed is:

1. A method for estimating a movement of particles in a bone, the method comprising steps of:
   obtaining first data associated with first ultrasonic waves emitted at a temporal frequency, the first data indicating:
      a first emission direction, the first emission direction being normal to a wavefront of the first ultrasonic waves towards a point located inside the bone, during their propagation in the bone, and
      a first reception direction, the first reception direction being normal to a wavefront of first ultrasonic echoes obtained by reflection of the first ultrasonic waves at the point, during their propagation in the bone,
   obtaining second data associated with second ultrasonic waves emitted at the temporal frequency, the second data being at least partly different from the first data, the second data indicating:
      a second emission direction, the second emission direction being normal to a wavefront of the second ultrasonic waves towards the point, during their propagation in the bone, and
      a second reception direction, the second reception direction being normal to a wavefront of the second ultrasonic echoes obtained by reflection of the second ultrasonic waves at the point, during their propagation in the bone,
   obtaining ultrasonic wave phase velocities in the bone in the following directions:
      the first emission direction,
      the first reception direction,
      the second emission direction, and
      the second reception direction,
   obtaining a first video showing the bone at the point, the first video issuing from the first ultrasonic echoes, and obtaining a second video showing the bone at the point, the second video issuing from the second ultrasonic echoes,
   computing a first phase variation at the point between two images of the first video, and a second phase variation at the point between two images of the second video, and
   computing a particle movement at the point from:
      the temporal frequency,
      the first data and the second data,
      the first phase variation and the second phase variation, and
      ultrasonic wave phase velocities in the bone.

2. The method according to claim 1, further comprising the following steps:
   transforming a first raw video issuing from the first ultrasonic echoes into a first transform, the first transform comprising:
      first information on movement of particles in the bone in a first direction, and
      second information on movement of particles in the bone in a second direction opposite to the first direction,
   filtering the first transform so as to obtain a first filtered transform comprising the first information but not comprising the second information, and
   the first video being generated by applying an inverse transformation to the first filtered transform.

3. The method according to claim 2, further comprising the following steps:
   transforming a second raw video issuing from the second ultrasonic echoes into a second transform, the second transform comprising:
      third information on movement of particles in the bone in the first direction, and
      fourth information on movement of particles in the bone in the second direction,
   filtering the second transform so as to obtain a second filtered transform comprising the third information but not comprising the fourth information, and
   the second video being generated by applying an inverse transformation to the second filtered transform.

4. The method according to claim 3, further comprising the following steps:
   filtering the first transform so as to obtain a first filtered complementary transform comprising the second information but not comprising the first information,
   generating a first complementary video showing the bone at the point, by applying an inverse transformation to the first filtered complementary transform,
   computing a first complementary phase variation at the point between two images of the first complementary video,
   filtering the second transform so as to obtain a second filtered complementary transform comprising the fourth information but not comprising the third information,
   generating a second complementary video showing the bone at the point, by applying an inverse transformation to the second filtered complementary transform,
   computing a second complementary phase variation at the point between two images of the second complementary video, and computing a complementary particle movement at the point from:
the temporal frequency,
the first data set and the second data set,
the first phase variation and the second phase variation, and
ultrasonic wave phase velocities in the bone.

5. The method according to claim 4, further comprising the following steps:
transforming a third raw video issuing from the third ultrasonic echoes into a third transform, the third transform comprising:
fifth information on movement of particles in the bone in the first direction, and
sixth information on movement of particles in the bone in the second direction, and
filtering the third transform so as to obtain a third filtered transform comprising the fifth information but not comprising the sixth information,
the third video being generated by applying an inverse transformation to the third filtered transform.

6. A method for estimating a movement of particles in a bone, the method comprising steps of:
obtaining first data associated with first ultrasonic waves emitted at a temporal frequency, the first data indicating:
a first emission direction, the first emission direction being normal to a wavefront of the first ultrasonic waves towards a point located inside the bone, during their propagation in the bone, and
a first reception direction, the first reception direction being normal to a wavefront of first ultrasonic echoes obtained by reflection of the first ultrasonic waves at the point, during their propagation in the bone,
obtaining second data associated with second ultrasonic waves emitted at the temporal frequency, the second data being at least partly different from the first data, the second data indicating:
a second emission direction, the second emission direction being normal to a wavefront of the second ultrasonic waves towards the point, during their propagation in the bone, and
a second reception direction, the second reception direction being normal to a wavefront of the second ultrasonic echoes obtained by reflection of the second ultrasonic waves at the point, during their propagation in the bone,
obtaining ultrasonic wave phase velocities in the bone in the following directions:
the first emission direction,
the first reception direction,
the second emission direction,
the second reception direction,
obtaining a first video showing the bone at the point, the first video issuing from the first ultrasonic echoes, and
obtaining a second video showing the bone at the point, the second video issuing from the second ultrasonic echoes,
computing a first phase variation at the point between two images of the first video, and a second phase variation at the point between two images of the second video,
computing a particle movement at the point from:
the temporal frequency,
the first data and the second data,
the first phase variation and the second phase variation, and
ultrasonic wave phase velocities in the bone;
the method further comprising:
obtaining third data associated with third ultrasonic waves emitted at the temporal frequency, the third data being at least partly different from the first data and the second data, the third data indicating:
a third emission direction, the third emission direction being normal to a wavefront of the third ultrasonic waves towards the point, during their propagation in the bone,
a third reception direction, the third reception direction being normal to a wavefront of the third ultrasonic echoes obtained by reflection of the third ultrasonic waves at the point, during their propagation in the bone,
obtaining a third video showing the bone at the point, the third video issuing from the third ultrasonic echoes,
computing a third phase variation at the point between two images of the third video,
obtaining additional ultrasonic wave phase velocities in the bone in the following directions:
the third emission direction,
the third reception direction,
wherein the movement is computed also from the third data, the third phase variation, and the additional ultrasonic wave phase velocities in the bone.

7. The method according to claim 6, further comprising the following steps:
transforming a first raw video issuing from the first ultrasonic echoes into a first transform, the first transform comprising
first information on movement of particles in the bone in a first direction, and
second information on movement of particles in the bone in a second direction opposite to the first direction, and
filtering the first transform so as to obtain a first filtered transform comprising the first information but not comprising the second information,
the first video being generated by applying an inverse transformation to the first filtered transform.

8. The method according to claim 7, further comprising the following steps:
transforming a second raw video issuing from the second ultrasonic echoes into a second transform, the second transform comprising
third information on movement of particles in the bone in the first direction, and
fourth information on movement of particles in the bone in the second direction, and
filtering the second transform so as to obtain a second filtered transform comprising the third information but not comprising the fourth information,
the second video being generated by applying an inverse transformation to the second filtered transform.

9. The method according to claim 8, further comprising the following steps:
filtering the first transform so as to obtain a first filtered complementary transform comprising the second information but not comprising the first information,
generating a first complementary video showing the bone at the point, by applying an inverse transformation to the first filtered complementary transform,
computing a first complementary phase variation at the point between two images of the first complementary video, filtering the second transform so as to obtain a second filtered complementary transform comprising the fourth information but not comprising the third information, generating a second complementary video showing the bone at the point, by applying an inverse transformation to the second filtered complementary transform, computing a second complementary phase variation at the point between two images of the second complementary video, and computing a complementary particle movement at the point from:
the temporal frequency,
the first data set and the second data set,
the first phase variation and the second phase variation, and
ultrasonic wave phase velocities in the bone.

10. The method according to claim 6, further comprising the following steps:
transforming a third raw video issuing from the third ultrasonic echoes into a third transform, the third transform comprising
fifth information on movement of particles in the bone in the first direction, and
sixth information on movement of particles in the bone in the second direction, and
filtering the third transform so as to obtain a third filtered transform comprising the fifth information but not comprising the sixth information,
the third video being generated by applying an inverse transformation to the third filtered transform.

11. The method according to claim 1, wherein the transformation is a Fourier transformation.

12. The method according to claim 1, wherein the temporal frequency has a value comprised between 0.1 MHz and 10 MHz.

13. The method according to claim 1, wherein the point is a crossing point for red blood cells.

14. A computer-readable memory storing computer-executable instructions for executing the steps of the method according to claim 1.

15. A device for estimating a movement of particles in a bone, the device comprising:
a memory configured to store:
first data associated with first ultrasonic waves emitted at a temporal frequency, the first data indicating:
a first emission direction, the first emission direction being normal to a wavefront of the first ultrasonic waves towards a point located inside the bone, during their propagation in the bone, and
a first reception direction, the first reception direction being normal to a wavefront of first ultrasonic echoes obtained by reflection of the first ultrasonic waves at the point, during their propagation in the bone, second data associated with second ultrasonic waves emitted at the temporal frequency, the second data being at least partly different from the first data, the second data indicating:
a second emission direction, the second emission direction being normal to a wavefront of the second ultrasonic waves towards the point, during their propagation in the bone, and
a second reception direction, the second reception direction being normal to a wavefront of the second ultrasonic echoes obtained by reflection of the second ultrasonic waves at the point, during their propagation in the bone,
ultrasonic wave phase velocities in the bone in the following directions:
the first emission direction,
the first reception direction,
the second emission direction,
the second reception direction,
a first video showing the bone at the point, the first video issuing from the first ultrasonic echoes, and a second video showing the bone at the point, the second video issuing from the second ultrasonic echoes, and
at least one processor configured to:
compute a first phase variation at the point between two images of the first video,
compute a second phase variation at the point between two images of the second video, and
compute a particle movement at the point from:
the temporal frequency,
the first data and the second data,
the first phase variation and the second phase variation, and
ultrasonic wave phase velocities in the bone.

16. An ultrasound system comprising:
a probe configured to:
emit first ultrasonic waves at a reference frequency towards a point located inside a bone,
receive first ultrasonic echoes, the first ultrasonic echoes being obtained by reflection of the first ultrasonic waves at the point,
emit second ultrasonic waves at the reference frequency towards the point,
receive second ultrasonic wave echoes, the second ultrasonic echoes being obtained by reflection of the second ultrasonic waves at the point,
an imaging device configured to
generate a first video showing the bone at the point from the first ultrasonic echoes,
generate a second video showing the bone at the point from the second ultrasonic echoes, and
a device for estimating the movement of particles in the bone according to claim 15.

* * * * *